Oct. 18, 1966 A. W. KERSTETER ET AL 3,279,533
EVAPORATOR AND IMPINGEMENT PLATE THEREFOR
Filed March 17, 1964

INVENTORS
FRANCIS C. FAULKNER
AMMON W. KERSTETER
BY

ATTORNEY

United States Patent Office 3,279,533
Patented Oct. 18, 1966

3,279,533
EVAPORATOR AND IMPINGEMENT PLATE THEREFOR
Ammon W. Kersteter, Newark, Del., and Francis Campbell Faulkner, Jr., Old Lyme, Conn., assignors to American Machine & Foundry Company, a corporation of New Jersey
Filed Mar. 17, 1964, Ser. No. 352,572
5 Claims. (Cl. 165—105)

This invention relates in general to distillation apparatus and, more particularly, to impingement plates which prevent slugs of water from passing them.

In many types of distillation apparatus the boiling of liquid being evaporated will throw up slugs of liquid. If these slugs of liquid reach a drop separator or the like, there is a danger that impurities may be carried over into the distillate. The carry-over of impurities into the distillate is particularly critical in distillation apparatus used to concentrate dangerous materials.

Conventionally, a flat perforated plate is used to break up slugs of water in an evaporator. Such a flat plate directs a major portion of the boiling water rising up as slugs of water back into the evaporating section of the evaporator. It is only supposed to allow fine droplets to proceed on to the separator. However, a conventional flat plate separator in certain critical applications will permit the undesirable carry over of contaminators into the distillate.

It is therefore, a main object of this invention to provide a superior impingement plate construction for use in distillation apparatus.

Figure 1:
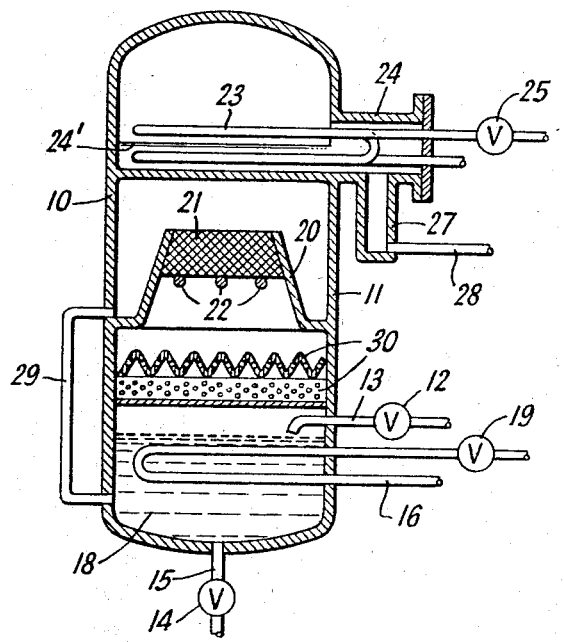
Figure 2:
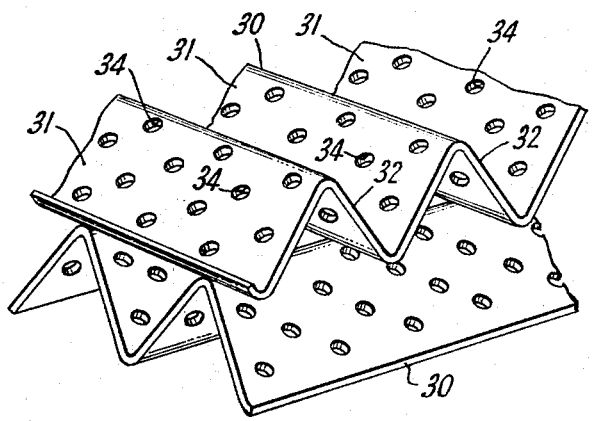

Many other objects, advantages and features of invention reside in the particular construction, combination and arrangement of parts involved in the embodiment of this invention and its practice as will be understood from the following description and accompanying drawing wherein:

FIGURE 1 is a longitudinal vertical section through a distillation apparatus containing an impingement plate according to this invention; and FIGURE 2 is a perspective view of a fragment of an impingement plate constructed according to this invention.

Referring to the drawing in detail, an evaporator and condenser unit 10 has an upright tank 11 which may be generally cylindrical or rectangular as desired. A valve 12 allows a desired inflow of aqueous radio active waste or other material to be concentrated to enter through pipe 13 into the bottom of tank 11. A valve 14 regulates the flow of concentrated aqueous waste or the like from tank 11 through pipe 15. A heating coil 16 extends into the bottom of tank 11 to heat the waste 18 within it. Valve 19 may be set to control the amount of hot water or steam flowing through heating coil 16.

A conical wall 20 divides the evaporator from the condenser of unit 10. A mesh drop separator 21 is held within the conical wall 20 by rods 22 or other suitable support means. Cooling coils 23 extend into the upper portion of tank 11 through the cylindrical extension 24. The valve 25 controls the flow of coolant through the coils 23. A trough 24' extends across the top of tank 11 below the cooling coils 23 and communicates with the cylindrical extension 24. Distillate passing through the mesh separator 21 condenses about the cooling coils 23 to drop into trough 24' and flow into the collecting well 27. Distillate may be drawn from the collecting well 27 through pipe 28. Any condensate not falling within trough 24' drips downward on the outside of the conical wall 20 to return through pipe 29 to the bottom of the tank 11.

During the boiling of an aqueous solution or other solution being concentrated in unit 10, slugs of liquid may be propelled violently upward. The impingement plate unit, generally designated by the numeral 30, deflects any such slugs of liquid downward and prevents them from reaching the mesh separator 21.

Referring now to FIGURE 2, the impingement plate 30 of this invention consists of at least one corrugated plate having the flat sides 31 and 32 of the individual corrugations. The sides 31 and 32 are formed at an angle of at least 45 degrees with the horizontal. Rows of apertures 34 are formed in the sides 31 and 32.

In the concentration of dangerous materials, it has been found that two plates 30 fixed together and disposed one above the other with their corrugations at right angles will provide best results.

These corrugated plates provide many advantages. First, each plate 30 provides a greater surface area than would a conventional flat plate of the same overall size. Second, since the perforations are at an angle of over 45 degrees to the direction of flow upward of steam, the vapor and fine water droplets must change direction in passing through the plate. This improves the plate's efficiency, as the more massive slugs of water are more likely to be deflected and not change their direction of flow to pass through the apertures 34.

Third, the low point or trough in each corrugation serves as a collection point for accumulating droplets removed from the vapor stream. This permits uninterrupted vapor flow through most of the apertures 34 in the plate as most liquid so collected will flow to the boiling section through holes in the lower portions of the sides of the corrugations. Thus the sides of the corrugations should each contain at least an upper and a lower row of perforations 34. This improves plate efficiency compared to conventional plates in which accumulated droplets generally pass downward through the apertures through which vapor is flowing upward. The downward movement of droplets counter to vapor flow decreases the efficiency of a conventional impingement plate compared to that of this invention.

Fourth, the corrugated shape of the plate of this invention has a high inherent strength in the direction parallel to the axis of the corrugations. This strength may be utilized as an integral internal column to stiffen the flat sides of a rectangularly shaped distillation apparatus. Thus the corrugated and perforated impingement plate serves as an inherent structural stiffening member as well as a primary vapor and liquid separating member.

What is claimed is:

1. In an evaporator having a container, a heating means in the lower part of said container, condensing means in the upper part of said container, and drop separator means between said heating means and said condensing means; an impingement plate below said drop separator means preventing slugs of liquid from reaching said drop separator means, said impingement plate comprising at least two corrugated plates disposed one above the other with their corrugations at an angle to each other and having sides containing perforations.

2. The combination according to claim 1 wherein the sides of said corrugations are inclined at an angle of at least 45 degrees with the horizontal.

3. The combination according to claim 1 wherein the sides of said corrugations contain at least two rows of perforations.

4. In an evaporator having a container, a heating means in the lower part of said container, condensing means in the upper part of said container, and drop separator means between said heating means and said condensing means; an impingement plate below said drop separator means preventing slugs of liquid from reaching said drop separator means, said impingement plate being two corrugated plates one below the other with the corrugations being at an angle to each other, said corrugations having sides being at an angle of at least 45 degrees with the horizontal and containing at least two rows of perforations.

5. In an evaporator having a container with side walls, a heating means in the lower part of said container, condensing means in the upper part of said container, and drop separator means between said heating means and said condensing means; an impingement plate below said drop separator means preventing slugs of liquid from reaching said drop separator means, said impingement plate being two corrugated plates one below the other with the corrugations being on an angle of about 90 degrees to each other and with at least portions of the ends of the corrugated plates being fixed to the side walls of said container, said corrugatings having sides being at an angle of at least 45 degrees with the horizontal and containing at least two rows of perforations.

References Cited by the Examiner
UNITED STATES PATENTS

| | | | |
|---|---|---|---|
| 2,127,917 | 8/1938 | Hobbs | 122—491 |
| 2,368,443 | 1/1945 | Biery | 55—442 |
| 2,960,449 | 11/1960 | Williamson | 202—197 |
| 2,990,693 | 7/1961 | Houplain | 165—105 |

ROBERT A. O'LEARY, *Primary Examiner.*

CHARLES SUKALO, *Examiner.*